United States Patent [19]

Valyi

[11] 4,048,361

[45] Sept. 13, 1977

[54] COMPOSITE MATERIAL

[76] Inventor: Emery I. Valyi, 5200 Sycamore Ave., Riverdale, N.Y. 10471

[21] Appl. No.: 710,171

[22] Filed: July 30, 1976

Related U.S. Application Data

[63] Continuation of Ser. No. 518,264, Oct. 29, 1974, abandoned.

[51] Int. Cl.$^2$ .................. B65D 23/00; B65D 23/02
[52] U.S. Cl. ............................ 428/35; 215/1 C; 426/127; 426/133; 426/415; 428/212; 428/483; 428/507; 428/509; 428/510; 428/513; 428/514; 428/518; 428/520; 428/522
[58] Field of Search ............... 161/404, 254, 166; 426/415, 133, 127; 428/35, 212, 483, 507, 509, 510, 518, 520, 522, 513, 514; 264/97; 215/1 C

[56] References Cited

U.S. PATENT DOCUMENTS

| | | | |
|---|---|---|---|
| 2,979,410 | 4/1961 | Parlour | 426/133 |
| 3,052,553 | 9/1962 | McKillip | 426/133 |
| 3,412,057 | 11/1968 | Fujitarri | 426/415 |
| 3,429,717 | 2/1969 | Cook | 428/910 |
| 3,552,998 | 1/1971 | Weyrra | 428/910 |
| 3,705,938 | 12/1972 | Hyman | 428/910 |
| 3,712,848 | 1/1973 | Casey | 428/910 |
| 3,719,735 | 3/1973 | Valyi | 264/265 |
| 3,733,309 | 5/1973 | Wyeth | 426/127 |

FOREIGN PATENT DOCUMENTS 1,031,035  5/1966  United Kingdom

OTHER PUBLICATIONS

"Antioxidants", Encycl. of Poly. Science and Tech., vol. 2, pp. 171-181, 1965.

Primary Examiner—Ellis Robinson
Attorney, Agent, or Firm—Robert H. Bachman

[57] ABSTRACT

A materials composite having improved resistance to permeation by unwanted substances, especially gas permeation. The composite includes a first layer of a barrier having partial resistance to permeation and a second layer adhered to the first layer. The composite includes a uniformly dispersed getter material capable of absorbing unwanted substance permeating through the barrier.

15 Claims, 5 Drawing Figures

COMPOSITE MATERIAL

This is a Continuation of application Ser. No. 518,264, filed Oct. 29, 1974 now abandoned.

BACKGROUND OF THE INVENTION

The use of partially permeable materials, e.g., impregnated or waxed paper, plastics, etc., presents a novel problem in the packaging of perishable commodities, such as edible oils and fats, other foods, carbonated beverages, wine and beer, and also of other materials that are affected by continuing exposure to air and airborne substances, or endangered by the loss of constituents, as, for example, in the case of carbon dioxide loss from carbonated beverages or aroma loss in spiced consumables. The problem derives from the fact that, in contrast to the materials customarily used for packaging under such conditions, namely glass and metal, these partially permeable materials do not provide absolute protection because they are never completely impervious.

The art has developed materials that are relatively impervious to given substances. These "better" materials tend to be more expensive, and despite the added cost even they have a finite permeability.

A typical instance is that of plastics which will be used as illustrative, although similar examples from the field of paper packaging, for example, could also be used. In the instance of plastics the approach taken heretofore was to develop barrier polymers with better permeation impedance for specific substances, such as oxygen, carbon dioxide, water vapor, aromatics, etc. These efforts did meet with considerable success. Thus, for example, the permeation rate of oxygen was reduced by a factor of several orders of magnitude from polystyrene to the newly developed acrylonitrile copolymers, or to terephthalic polyesters. Nevertheless, a definite amount of permeation remains even in the best plastic due to the molecular arrangement thereof.

As a result, a new factor has to be introduced whenever it was desired to package perishables in plastic or other partially permeable materials, namely shelf-life. While a metal can or glass jar will keep its contents unchanged for a practically indefinite period, a time limit, mostly in terms of weeks, has to be prescribed for the plastics, modified paper, etc.

Accordingly, it is a principal object of the present invention to provide a novel material having improved resistance to permeation, especially gas permeation.

It is a further object of the present invention to provide a material as aforesaid which utilizes a partially permeable barrier material and which significantly increases its resistance to gas permeation.

It is a still further object of the present invention to inexpensively and conveniently provide a material as aforesaid.

Further objects and advantages of the present invention will appear hereinafter.

SUMMARY OF THE INVENTION

In accordance with the present invention, it has now been found that the foregoing objects and advantages can be readily obtained. The present invention resides in a composite material and a composite container having improved resistance to permeation, especially gas permeation. The composite of the present invention includes a first barrier layer having substantial but incomplete resistance to permeation and a second layer adjacent to the first layer, with the two layers being adhered to each other substantially over their entire contacting areas. In accordance with the present invention the second layer comprises a uniformly dispersed getter material capable of binding the unwanted material. The getter material may, for example, be dispersed within a carrier, or dispersed between the first layer and a third layer, or embedded in the barrier.

The getter is a material which is capable of chemically binding, absorbing, or adsorbing the unwanted fluid or permeating material. Thus, for example, an anti-oxidant may be used to absorb and bind oxygen. In a preferred embodiment one utilizes a carrier material and a uniformly dispersed getter carried by said carrier. The carrier and getter material are superimposed upon a barrier which is chosen to provide substantial but incomplete resistance to permeation of the unwanted material. Hence, if migration of oxygen is to be prevented, the carrier and getter material, preferably dispersed into a carrier, would be laminated to a barrier material which is resistant to migration of oxygen, e.g., cellophane, an acrylonitrile containing polymer and the like.

The resultant composite of the present invention has greatly improved resistance to permeation by an unwanted material, for example, gas permeation. In fact, a container may be fabricated which is characterized by being virtually impervious to the unwanted material.

In operation such composite is capable of making use of a good barrier material which nevertheless has a finite permeability, permitting comparatively small amounts of the unwanted material to migrate therethrough in such a manner that said unwanted material, to the extent that it so migrates and at the rate of its migration, is "captured" by a getter capable of stopping further migration, i.e., diffusion or other flow of said material.

Obviously, if the said barrier were to permit substantial permeation, i.e., if it were a poor barrier, the amount of getter that may be practically juxtaposed thereto would be exhausted too soon for practical purposes.

If necessary, three or more layers may be employed; for example, the carrier may be sandwiched between two barrier layers, or the barrier layer may itself be a laminate. Thus, one may design a composite having resistance to a variety of gases and other undesired materials based on the characteristics of the barrier layers and/or the getter materials. As a still further alternative, two or more different getter materials may be used, for example, as incorporated into a carrier to provide protection against two or more different gases.

In the container of the present invention, the barrier must obviously be adjacent the environment containing the material that is undesired and that is to be impeded in its migration.

BRIEF DESCRIPTION OF DRAWINGS

The present invention will be more readily understandable from a consideration of the accompanying drawings in which.

DETAILED DESCRIPTION

Figure 1:
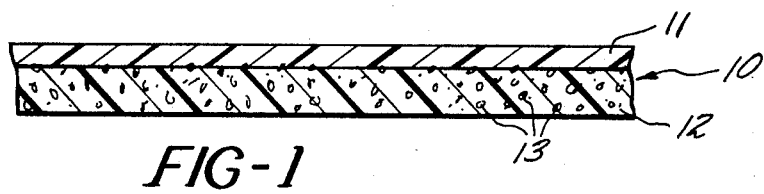
FIG. 1 is a sectional view of one embodiment of a composite of the present invention.

As one embodiment shown in FIG. 1, the composite of the present invention is a sheet-like laminate 10 having a first layer 11 of a barrier having resistance to permeation by an unwanted molecule, and a second carrier layer 12 adjacent the first layer. The two layers are adhered one to the other by any desired means, as by adhesive or electrostatic bonding, or heat sealing, substantially, over their entire contacting areas so as to avoid delamination and thereby the entry of unwanted molecules into the second layer 12 other than through layer 11.

The barrier layer 11 is a material which is capable of hindering substantially the permeation of an unwanted material, as a gas, therethrough. Typical barrier materials include gas, oxygen or carbon dioxide barriers. Representative barrier materials include very dense paper grades made from highly hydrated pulp, e.g., the so-called "grease proof" and "glassine" grades, parchment paper, i.e., acid treated paper having a gelatinized surface, or several natural or synthetic polymers, e.g., cellulosics, acrylonitrile copolymers, terephthalic polyesters, polyethylene terephthalates, polyvinylidine dichloride, and also elastomers, such as butyl rubber, and so forth. Naturally, the particular barrier material used depends upon the particular fluid or other substance desired to be impeded.

The carrier layer may be any suitable material generally chosen for low cost, compatibility with the getter, and suitability for the particular application. Thus, a cellulosic material may readily be employed, paper and paper board, woven textile fibers, natural or synthetic waxes, or plastic materials, such as polyolefins, polyvinyl chloride, polystyrene and the like.

In the preferred embodiment the getter material is incorporated into the carrier, or incorporated into the carrier plus dispersed between the carrier and barrier layers, as shown in FIG. 1, with the getter 13 uniformly dispersed throughout carrier 12. This enables a volume of getter to be distributed throughout the carrier to provide a large surface for contact with the unwanted gas. Thus, in this embodiment, the carrier should be capable of holding the getter uniformly distributed throughout the carrier. Alternatively, and less desirably, the getter may be simply placed on the surface of the barrier layer or carrier and laminated therebetween.

The getter will usually be an antioxidant if its function is to be the prevention of oxidation (and rancidity), for example, butylated hydroxyanisole, di-tertiary-butyl-paracresol, propyl gallate, phenylenethiourea, and aldolalpha-naphthylamine. Naturally, others will readily appear to one skilled in the art. A substantial number of proprietary antioxidants are known to exist, as for example, listed on pages 699–703 of the Modern Plastics Encyclopedia, Vol. 50, No. 10A, October 1973.

The getter may be designed to react with other gases than oxygen; for example, activated charcoal may be used, or bactericides may be employed to minimize bacteria or virus transmission. The getter material may be chosen to selectively bind virtually any unwanted material. The dispersion of the getter material in an inexpensive carrier suited to receive the dispersion is a particularly convenient and effective procedure for a variety of reasons. It avoids having to admix the getter with the barrier and possibly vary the desirable properties thereof. It enables one to select an inexpensive carrier which is especially suitable for the particular getter employed, and disperse the getter throughout the carrier so that a large volume of getter surface is available for contact with the unwanted molecule. It avoids having to tamper with the thickness of a possibly expensive barrier layer, and utilize only so much of the barrier layer as is necessary to achieve the desired goal.

The physical requirements of the getter system relate to the processing characteristics of its components. Thus, if it is desired to produce the system in the form of a film, it will usually be necessary to choose the getter with the fact in mind that it must be stable at the temperature at which the carrier may have to be worked for the blending-in of the getter; and also at the temperature at which the system has to be processed to convert it into a unitary structure, e.g., a film by extrusion. The system may of course assume many other forms than film; it may be a pressure molded piece, a getter loaded into paper, the getter impregnated into a textile, printed upon a carrier surface, etc. In any such instance, the known art of preparing the system will dictate the specific selection of its components, beyond the basic selection of the chemical function. One particular category of getter may be that of surface active agents, as for example carbon, whereby the carrier would be applied to hold such getter without impeding its surface. The carrier may of course be used to provide characteristics to the structure of which it is a part that are per se unrelated to the specific purposes of this invention: it may be colored, for decorative effect; or, it may be a barrier in its own right, as, for example, glassine paper or a polyolefin carrier would naturally be water vapor barriers.

Figure 2:
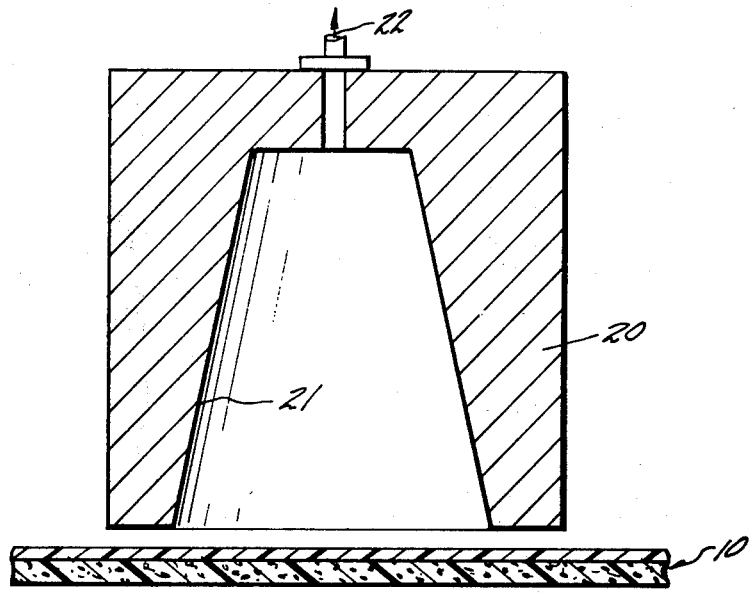
FIG. 2 is a diagrammatic view of a forming mold for forming a cup-like container from the composite of the present invention.

The composite of the present invention may be readily formed into containers of a configuration best suited for a particular use, for example, into rigid containers, such as bottles, jars and cups, laminated to metal or glass to provide added protection thereto, formed into pouches or bags or sacks or the like. The formation of a typical cup-like container is shown in FIG. 2, with the resultant container shown in FIG. 3. In FIG. 2 composite 10 is placed into juxtaposition with a mold 20 having a mold cavity 21 conforming to the shape of the desired article. Vacuum is applied in the mold cavity through connection 22 and the composite 10 is converted to the shape of mold cavity 21 to form cup-like article or container 23 by vacuum forming, i.e., by a drawing process that intrinsically produces attenuation of the composite 10. Naturally, the container of the present invention may be formed by a wide variety of other methods well known in the art. For example, instead of drawing the composite into a mold, the composite may be drawn by vacuum over a shaped plug, or produced by cooperation of a mold and plug as known in the thermoforming art, or it may be wrapped into container shape, as is customary in the manufacture of paper containers. Cover 24 (FIG. 3) should also naturally provide resistance to permeation as being formed from the composite of the present invention. The cover may be applied to the container by any suitable or convenient method, as by heat sealing or providing the container and cover with mating threaded portions, for example. If the container protects against oxygen permeation, for example, entrance of oxygen through the sealed cover may be prevented by a variety of methods, as by heat sealing the cover to the container, or by providing a depending barrier flange such as flange 24a so that the carrier layer is not exposed to the permeating environment.

A particularly advantageous method of forming the container of the present invention is shown in my prior U.S. Pat. Nos. 3,719,735 and 3,717,544. According to said patents, a previously formed, sleeve-like liner, which may, for example, be the barrier or getter-containing carrier of the present invention, is applied to a blow core of an injection blow molding apparatus, plastic is injected around said liner while upon the core, which may, for example, be a barrier plastic, and the resultant composite parison, consisting of the liner and the injected plastic, expanded togther into conformity with a blow mold.

Figure 3:
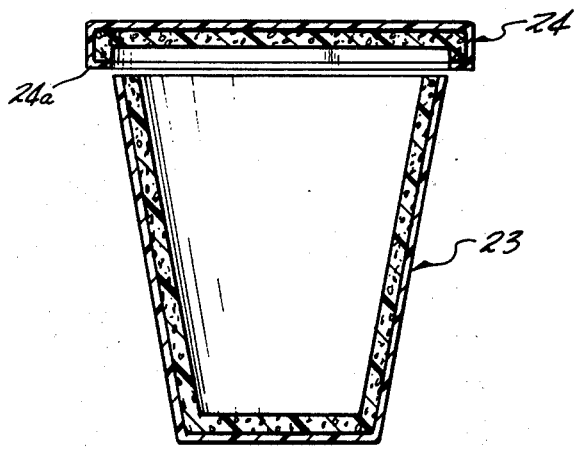
FIG. 3 is a sectional view of the cup-like container formed in FIG. 2, together with a cover therefor.

As indicated hereinabove, the barrier plastic should be adjacent the environment with the material desired to be impeded. Thus, if oxygen permeation into the contents of a container is to be impeded, the barrier layer should be the outer layer and the getter should be the inner layer, as shown in FIG. 3, so that the barrier provides primary protection against oxygen permeation. Any oxygen permeating the barrier plastic will then be bound by the getter. If, however, one wishes to prevent migration of a substance from the inside of a container, as for example that of an irritating or malodorous substance, the barrier should be the innermost layer.

Figure 4:
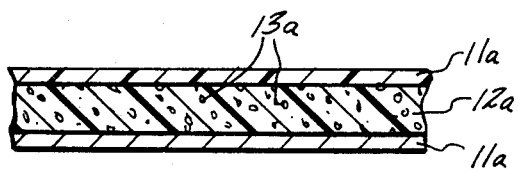
FIG. 4 is a sectional view of a three layered composite of the present invention.
Figure 5:
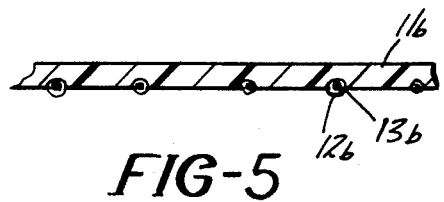
FIG. 5 is a sectional view of another embodiment of a composite of the present invention wherein the getter is embedded in the barrier.

Alternatively and advantageously, one may use a three layered laminate as shown in FIG. 4, wherein two barrier layers 11a are placed on either side of a carrier layer 12a containing a getter material 13a uniformly dispersed throughout. As a still further alternative, one may use a composite as shown in FIG. 5, wherein getter 13b is coated with a permeable carrier 12b and embedded in barrier 11b.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A rigid composite container having improved resistance to unwanted gas permeation comprising a first barrier layer having substantial resistance to said gas permeation, a second carrier layer selected from the group consisting of plastic material and cellulosic material adjacent said first layer, the two layers being adhered one to the other substantially over their entire contacting areas, and a uniformly dispersed getter material capable of binding the unwanted gas in an amount sufficient to bind up any unwanted gas permeating the barrier layer, said getter material being carried by said carrier layer, wherein the barrier layer is in the position first exposed to the unwanted gas and is outermost with respect to said carrier layer, whereby the barrier layer provides initial and substantial but incomplete resistance to said gas permeation and gas passing through the barrier layer contacts dispersed getter material and is bound up thereby, said container having a hollow, bottle, jar or cup-like configuration and an open neck closed by a cover having resistance to said unwanted gas permeation.

2. A container according to claim 1 wherein said cover includes a depending barrier flange.

3. A container according to claim 1 wherein said cover is a composite of said barrier layer, said carrier layer adjacent and adhered to said barrier layer, and said uniformly dispersed getter carried by the carrier layer, wherein the barrier layer is outermost with respect to the carrier layer.

4. A container according to claim 3 wherein said cover includes a depending barrier flange covering the carrier layer so that the carrier layer is not exposed said unwanted gas.

5. A container according to claim 1 wherein said getter is uniformly dispersed within said carrier layer.

6. A container according to claim 1 wherein said getter is uniformly dispersed between said barrier layer and said carrier layer.

7. A container according to claim 1 wherein said getter is embedded in the barrier layer.

8. A container according to claim 1 wherein said getter is uniformly dispersed adjacent said barrier, embedded therein and coated with said carrier material.

9. A container according to claim 1 wherein said getter is an antioxidant.

10. A container according to claim 1 wherein said getter is propyl gallate.

11. A container according to claim 1 wherein the barrier layer is selected from the group consisting of acrylonitrile-containing polymers, terephthalic polyesters, polyvinylidene dichloride, cellulosic materials and elastomers.

12. A container according to claim 1 wherein the carrier layer is selected from the group consisting of polyolefins, polystyrene and polyvinyl chloride.

13. A container according to claim 1 wherein said carrier layer is sandwiched between two barrier layers.

14. A container according to claim 1 wherein said container is a blow molded container.

15. A container according to claim 14 wherein the inner layer is a previously formed, sleeve-like liner, the outer layer is injected around said liner and the inner layer-outer layer composite is expanded together into conformity with a blow mold.

* * * * *